Aug. 10, 1965  W. W. SPOECKER  3,199,812
LIGHTNING PROTECTIVE VAPOR VENT
Filed Dec. 18, 1963  2 Sheets-Sheet 1
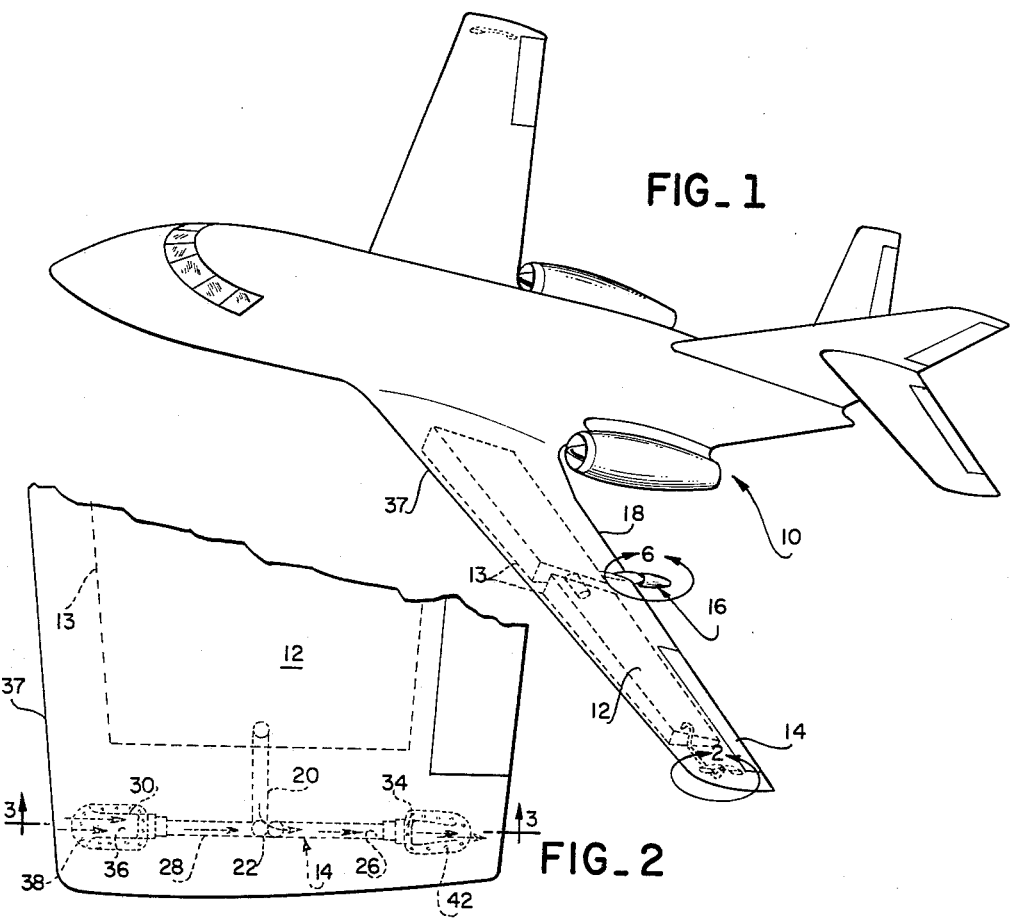
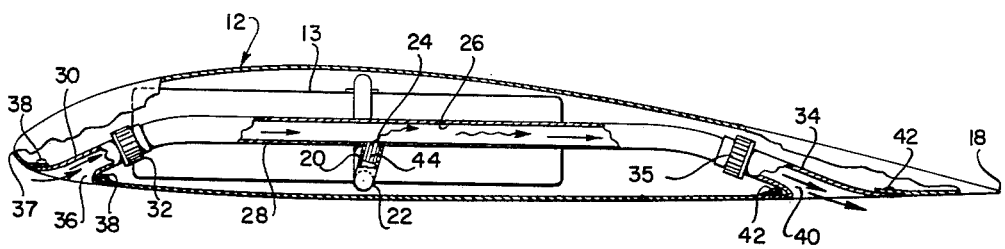
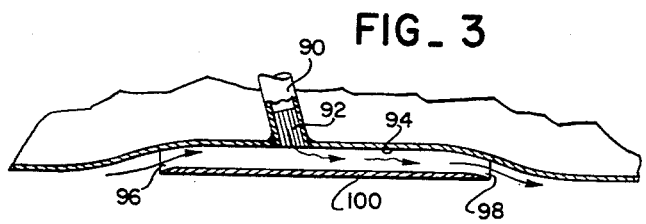
*INVENTOR.*
WALTER W. SPOECKER
BY
George C. Sullivan
Agent Aug. 10, 1965     W. W. SPOECKER     3,199,812
LIGHTNING PROTECTIVE VAPOR VENT
Filed Dec. 18, 1963     2 Sheets-Sheet 2
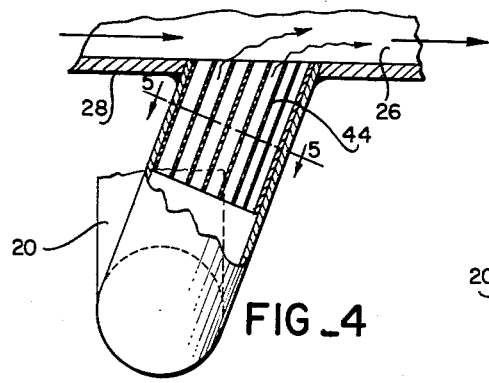
FIG_4
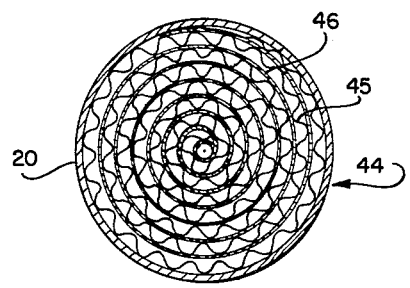
FIG_5
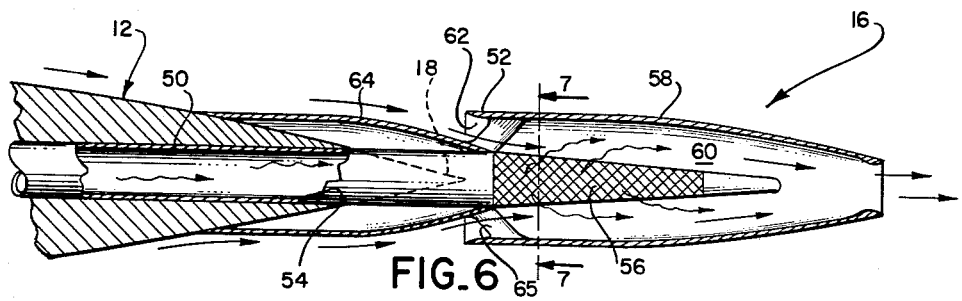
FIG_6
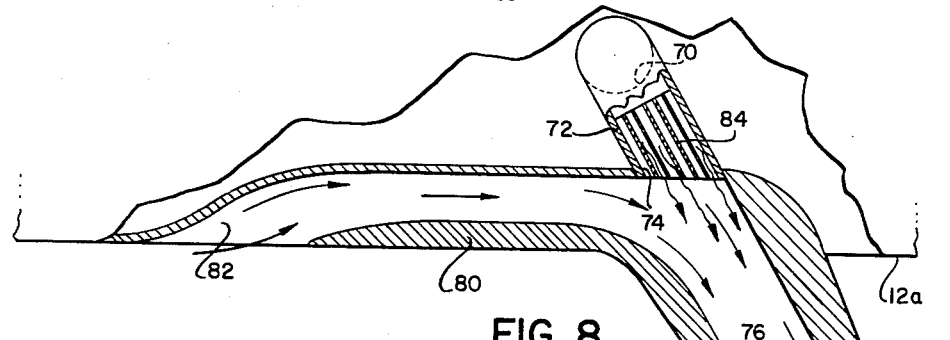
FIG_8
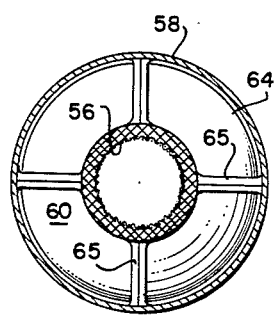
FIG_7
INVENTOR.
WALTER W. SPOECKER
BY
George C. Sullivan
Agent

United States Patent Office 3,199,812
Patented Aug. 10, 1965

3,199,812
LIGHTNING PROTECTIVE VAPOR VENT
Walter W. Spoecker, Van Nuys, Calif., assignor to Lockheed Aircraft Corporation, Burbank, Calif.
Filed Dec. 18, 1963, Ser. No. 331,457
10 Claims. (Cl. 244—135)

This invention relates to lightning protective vapor vents and more particularly to a fuel vent for a flight vehicle which minimizes the danger of lightning strikes at the vent outlet.

Flight vehicles are considered relatively immune to lightning strikes. This is primarily due to the fact that the metal skin of the vehicle dissipates the lightning energy rapidly without damage to the structure of the vehicles. It is known, however, that flammable-vapor vent outlets are subject to direct lightning strikes which can cause explosions in the vented space.

Two prior art methods of minimizing such lightning hazards are to locate the vent outlets in areas of low lightning potentially and to incorporate flame arrestors in vent outlets. Such selected areas are often infeasible from a design standpoint. Neither of these methods provide complete protection against all kinds of lightning strikes.

Accordingly, it is a primary object of the present invention to provide lightning protective vapor vents for flight vehicles.

Another object of the present invention is to provide a fuel vent for a flight vehicle which incorporates means for accelerating the vapor discharging from the vent line beyond the speed of flame propagation.

Yet another object of the present invention is to provide a fuel vent for a flight vehicle which mixes ram air with vapor discharging from a vent outlet and then discharges the mixture to atmosphere at a speed well above the maximum propagation speed of the mixture.

A further object of the present invention is to provide means in combination with the fuel vent of a flight vehicle for protecting the vent exit against direct lightning strikes.

According to the present invention, each outlet of the vent line in a flight vehicle is connected to a mixing channel. A ram-air scoop of the type known in the art as non-icing, and preferably recessed, is also connected to the mixing channel for introducing ram air which is mixed with the vapor discharging from the outlet. The mixture is then discharged into atmosphere at a speed well above the maximum propagation speed of the mixture. The mixing channel protects the vent outlet into the mixing channel against direct lightning strikes. The recessed ram scoop also minimizes icing problems at the mixing channel inlet.

A flame arrestor is sometimes installed in the outlet to provide additional protection against lightning strikes at the ram-air inlet.

The features of the present invention which are believed to be novel are set forth with particularity in the appended claims. The present invention, both as to its organization and manner of operation, together with further object and advantages thereof, may best be understood by reference to the following description, taken in connection with the accompanying drawings, in which:

FIGURE 1 is a perspective view of a flight vehicle incorporating lightning protective vapor vents of the present invention;

FIGURE 2 is a plan view, on an enlarged scale, of the area generally enclosed in circle 2 of FIGURE 1;

FIGURE 3 is a cross-sectional view taken along line 3—3 of FIGURE 2;

FIGURE 4 is an enlarged view of a flame arrestor such as incorporated in the vapor vents of FIGURES 2, 3, 8 and 9;

FIGURE 5 is an enlarged cross-sectional view of a typical flame arrestor as taken along line 5—5 of FIGURE 4;

FIGURE 6 is an enlarged view of the area enclosed in circle 6 of FIGURE 1 showing a vapor vent of the present invention incorporated in the trailing edge of a wing of a flight vehicle;

FIGURE 7 is a cross-sectional view taken along line 7—7 of FIGURE 6;

FIGURE 8 is a cross-sectional view of a vapor vent of the present invention incorporated in an aircraft fuel tank vent of the mast type; and FIGURE 9 is a cross-sectional view of a vapor vent of a further embodiment of the invention.

Referring again to the drawings, a flight vehicle 10 includes a wing 12 in which is mounted a dual type fuel tank 13. Lightning protective vapor vents of the present invention are provided for ventilating fuel tank 13. Accordingly, a first plurality of fuel vents of the invention generally designated 14, may be located on the surface of wing 12. A second plurality of fuel vents of the invention, such as the one generally designated 16, may be located on the trailing edge 18 of the wing 12.

The fuel vent 14 includes a vent or vapor discharge line 20 mounted in wing 12 for discharging vapors from the fuel tank 13. The flame propagation ratio of these vapors are either available or readily determinable. The vapor discharge line 20 includes an outlet section 22 having an outlet port 24 discharging into a mixing channel 26. The mixing channel 26 is formed by mounting a tubular member 28 in the wing 12, preferably parallel to the air flow direction across the wing. One end of the tubular member 28 is connected to a recessed air scoop 30, typically by a coupling 32. The other end of the tubular member 28 is connected to a ram air-vapor outlet member 34 by a coupling 36.

The air scoop 30 is positioned in a first aperture 36 on the lower surface of wing 12 adjacent its leading edge 37 and is secured in position therein by rivets 38. The outlet structure 34 is mounted in a second aperture 40 on the lower surface of wing 12 adjacent the trailing edge 18 and is secured in such position by rivets 42. Ram air enters the scoop 30, mixes with the vapor in channels 26 and discharges the mixture from outlet 34 at a speed exceeding the flame propagation speed of the vapor. Thus, a lightning strike at outlet 34 cannot propagate upstream to the port 24. Although the tubular member 28 acts as cover means in positively preventing the possibility of a direct lightning strike at outlet 24, an additional safety margin for this safety-in-flight structure is sometimes provided by a flame arrestor 44 mounted in the outlet section 22. This further prevents flame propagation through the vent outlet 24 as a result of a lightning strike at their air scoop 30. A typical flame arrestor 44, as better illustrated in FIGURES 4 and 5, comprises a corrugated metallic sheet 45 which is backed with a smooth metallic sheet 46 and coiled upon itself in outlet section 22.

The vent 16, of alternative configuration, and as illustrated in FIGURES 6 and 7, includes a vent line 50 which communicates with the fuel tank 13 in wing 12. The line 50 includes an outlet end 52 extending through an aperture 54 in the trailing edge 18 of wing 12. The line 50 discharges fuel vapors having a predeterminable flame propagation speed.

A conical arrestor 56 of wire mesh construction, for example, is connected to the discharge end 52 for the same purpose set forth above with respect to flame arrestor 44. The arrestor 56 is peripherally encompassed by a tubular member 58 which forms a mixing chamber 60. Vapor discharging from line 50 through arrestor 56 is mixed with ram air which enters chamber 60 through an inlet portion 62 of the tubular member 58. The inlet portion 62 is recessed radially inward from the outer extremity of the fairing member 64 which is attached to the trailing edge 18 of wing 12 to provide a non-icing feature, i.e., due to their inertia, water droplets traverse the inlet tangentially while the air is caused to follow the annular contour. The ram air accelerates the vapor discharging from the line 50 within the mixing chamber 60 to a speed beyond its flame propagation speed. The tubular member 58 is connected to the fairing member 64 by struts 65. This aspirator type embodiment may be mounted upon a strut extending from the lower or upper surface of the wing with equal effectiveness. In either event, the structure covering the feul vent prevents lightning from striking the vent outlet directly.

On a flight vehicle, it is sometimes necessary to attach a mast to vapor vents to prevent re-entry of discharged vapors into the vehicle, for example, vapors must be prevented from entering access doors, etc., to the vehicle. FIGURE 8 illustrates such a vapor vent which incorporates the lightning protective features of the present invention.

In FIGURE 8, a vapor outlet line 70 is mounted in an aircraft wing 12a. The outlet line 70 is connected to an outlet section 72 having an outlet aperture 74 discharging into a mixing chamber 76 interconnecting the channels of a vent mast 78 and a ram air scoop 80. The mast and scoop structures prevent direct lightning strikes. As ram air enters the inlet 82 of scoop 80, it mixes with vapor discharging from outlet aperture 74 and sweeps the mixture through the mast 78 at a speed exceeding the flame propagation speed of the mixture. A flame arrestor 84 of the general type shown in FIGURES 4 and 5 may be mounted in the outlet section 72 as additional protection against lightning strikes to the inlet 82.

FIGURE 9 shows a basic, simplified version of the invention. Therein the vent line 90, including a flame arrestor 92 discharges into a passage 94 interconnecting a ram air inlet 96 and an outlet 98, the action being substantially the same as in the embodiments heretofore described. The structure 100 may be said to provide a cover means over the vapor line discharge to prevent direct lightning strikes and to define with the balance of the wing structure the necessary passage for conducting relatively high velocity air past the vent discharge region.

While the particular lightning protective vapor vents herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A lighning protective fuel vent for flight vehicles comprising:
   (a) a vent line leading from a fuel tank to a region adjacent an external surface of the vehicle and including an outlet portion; and
   (b) cover means attached to said vehicle positioned over said vent outlet portion so as to prevent lightning from directly striking said outlet portion, and defining at least a portion of a continuously open conduit for continuously conducting air past said vent outlet portion during flight operation.

2. The lightning protective fuel vent of claim 1 wherein said conduit is defined by said cover means in cooperation with other vehicle structure.

3. In a fuel vent including an outlet for discharging combustible vapor, the combination comprising:
   (a) mixing-channel means connected to the outlet;
   (b) fluid supply means connected to said mixing-channel means for supplying a fluid thereto so as accelerate said vapor within said mixing-channel means to a speed exceeding the flame propagation speed of the combustible vapor; and
   (c) a discharge port connected to said mixing-channel means for discharging said accelerated vapor from said mixing-channel means.

4. The combination of claim 3 including a flame arrestor mounted in said outlet.

5. In combination with a flight vehicle fuel vent, including an outlet for discharging vapor having a predetermined flame propagation speed, means for preventing lightning from striking the outlet directly and for accelerating the speed of the discharged vapor, comprising:
   (a) mixing channel means connected over said outlet;
   (b) air scoop means connected to said mixing-channel means for mixing air with said vapor, said air scoop means having an air inlet which remains open continuously throughout vehicle flight and being mounted on said flight vehicle in such a manner that the forward motion of said flight vehicle introduces air at a rate sufficiently high to accelerate vapor within said mixing-channel means to a speed exceeding the predetermined flame propagation speed; and
   (c) discharge port means connected to said mixing-channel means for discharging the accelerated vapor from said mixing-channel means.

6. The combination of claim 5 including a flame arrestor mounted in said outlet.

7. In combination with a flight vehicle fuel vent which includes an outlet portion extending exteriorly of the flight vehicle for discharging vapor therefrom, the vapor having a predetermined flame propagation speed, means covering the outlet portion and for accelerating the discharged vapor, comprising:
   (a) a tubular member forming a mixing-channel adjacent said outlet portion, said tubular member having an upstream end forming a ram air inlet for mixing ram air with the vapor and accelerating the vapor within said channel to a speed exceeding the predetermined flame propagation speed; and
   (b) discharge port means connected to said tubular member for discharging the accelerated vapor from said channel.

8. The combination of claim 7 including a flame arrestor connected to said outlet.

9. In an aircraft wing having a trailing edge, a fuel vent comprising:
   (a) a vapor discharge line mounted in the wing, said discharge line having an outlet extending from the trailing edge for discharging fuel vapors having a predetermined flame propagation speed;
   (b) a tubular member connected to and encompassing said outlet, said tubular member having a ram air inlet adjacent said trailing edge for admitting ram air to said tubular member to mix the ram air with the vapor and accelerating the vapor to a speed exceeding said predetermined speed; and
   (c) a discharge port structure connected to said tubular member for discharging the accelerated vapor therefrom.

10. In a flight vehicle, a lightning protective vapor vent comprising:
    (a) a vapor discharge line;
    (b) a standpipe connected to said vapor discharge line and extending from a surface of the vehicle for discharging vapors exteriorly of the flight vehicle; and
    (c) a ram-air scoop mounted on the vehicle in communication with said vapor discharge line and said standpipe for admitting ram air thereto to accelerate the discharge rate of vapors emitted from said vapor discharge line to a speed above the flame propagation speed thereof.

References Cited by the Examiner

UNITED STATES PATENTS

| | | | |
|---|---|---|---|
| 2,283,502 | 5/42 | Hughes et al. | 244—135 |
| 2,821,991 | 2/58 | Marx | 48—192 |
| 2,936,099 | 5/60 | Smith | 222—189 |
| 2,936,974 | 5/60 | Shaw | 244—135 |
| 3,139,123 | 6/64 | Lisciani | 222—189 |

FOREIGN PATENTS 438,710   12/26   Germany.

FERGUS S. MIDDLETON, *Primary Examiner.*